United States Patent

[11] 3,577,152

[72] Inventor Koichi Yahagi
Kawasaki-shi, Japan

[21] Appl. No. 834,220
[22] Filed June 10, 1969
[45] Patented May 4, 1971
[73] Assignee Nippon Columbia Company, Limited
[32] Priority Oct. 3, 1967
[33] Japan
[31] 42/83898
Continuation-in-part of application Ser. No. 760,603, Sept. 18, 1968.

[54] ARRANGEMENT FOR COLOR TELEVISION RECEIVER
11 Claims, 10 Drawing Figs.

[52] U.S. Cl. .......... 178/5.4, 325/462
[51] Int. Cl. .......... H04n 9/12
[50] Field of Search .......... 178/5.4 (CK), 5.4 (ACC), 5.4, 69.5 (CB); 330/29, 30, 31, 17, 21, 126; 325/462, 315; 329/113, 122, 132, 134, 155, 192; 307/237, 235

[56] References Cited
UNITED STATES PATENTS

| | | | |
|---|---|---|---|
| 2,545,420 | 3/1951 | Sziklai | 178/5.4 |
| 2,910,528 | 10/1959 | Peterson | 178/5.4 |
| 2,896,015 | 7/1959 | Smith | 178/5.4 |
| 3,264,566 | 8/1966 | Kaufman et al. | 325/462 |

*Primary Examiner*—Richard Murray
*Assistant Examiner*—Alfred H. Eddleman
*Attorney*—Hill, Sherman, Meroni, Gross & Simpson

ABSTRACT: A video amplifier circuit arrangement for a color television receiver which is capable of effectively meeting a contradictory relationship between the production of a picture with high resolution during reception of black-and-white television broadcast and the production of a color picture free from dotted pattern during reception of color television broadcast.

INVENTOR
KOICHI YAHAGI

BY Hill, Sherman, Meroni, Gross & Simpson ATTORNEY

INVENTOR
KOICHI YAHAGI

BY Hill, Sherman, Meroni, Gross & Simpson ATTORNEY

INVENTOR
Koichi Yahagi

BY
Hill, Sherman, Meroni, Gross & Simpson
ATTORNEY

INVENTOR
Koichi Yahagi

BY Hill, Sherman, Meroni, Gross & Simpson ATTORNEY

INVENTOR
Koichi Yahagi

BY Hill, Sherman, Meroni, Gross & Simpson
ATTORNEY

ARRANGEMENT FOR COLOR TELEVISION RECEIVER

REFERENCE TO RELATED APPLICATIONS

This application is a continuation-in-part of application Ser. No. 760,603, filed Sept. 18, 1968 by Koichi Yahagi, entitled VIDEO AMPLIFIER CIRCUIT ARRANGEMENT FOR COLOR TELEVISION RECEIVER.

BACKGROUND OF THE INVENTION

Field of the Invention

This invention relates to a video amplifier circuit arrangement for a color television receiver.

With a color television receiver, high quality picture with high resolution can be produced if the video amplifier circuit incorporated therein represents a satisfactory frequency response at high frequencies. It is desired that high resolution be attained especially in reception of black-and-white broadcast signals. If the video amplifier circuit represents such high-frequency response at high frequencies, however, a color subcarrier wave modulated with a color signal (referred to simply as color signal hereinafter) present in the higher frequency range is not attenuated during reception of color television broadcast, so that dotted pattern tends to appear in resulting picture due to the subcarrier frequency component. Thus, an attempt to produce a picture with high resolution during reception of black-and-white television broadcast is contradictory to an attempt to produce a color picture free from such dotted pattern during reception of color television broadcast.

Accordingly, it is a primary object of the present invention to provide a video amplifier circuit arrangement for a color television receiver, which is capable of effectively meeting the aforementioned contradictory relationship between the production of a picture with high resolution during reception of black-and-white television broadcast and the production of a color picture free from dotted pattern during reception of color television broadcast.

Another object of this invention is to provide a video amplifier circuit arrangement for a color television receiver, which is so designed as to effectively meet the aforementioned contradictory relationship with the aid of a simplified circuit which is controlled so as to be rendered nonconductive or conductive according to whether black-and-white or color television broadcast is received.

Other objects, features and advantages of the present invention will become apparent from the following detailed description taken in conjunction with the accompanying drawings, in which:

DESCRIPTION OF THE PREFERRED EMBODIMENTS

Figure 1:
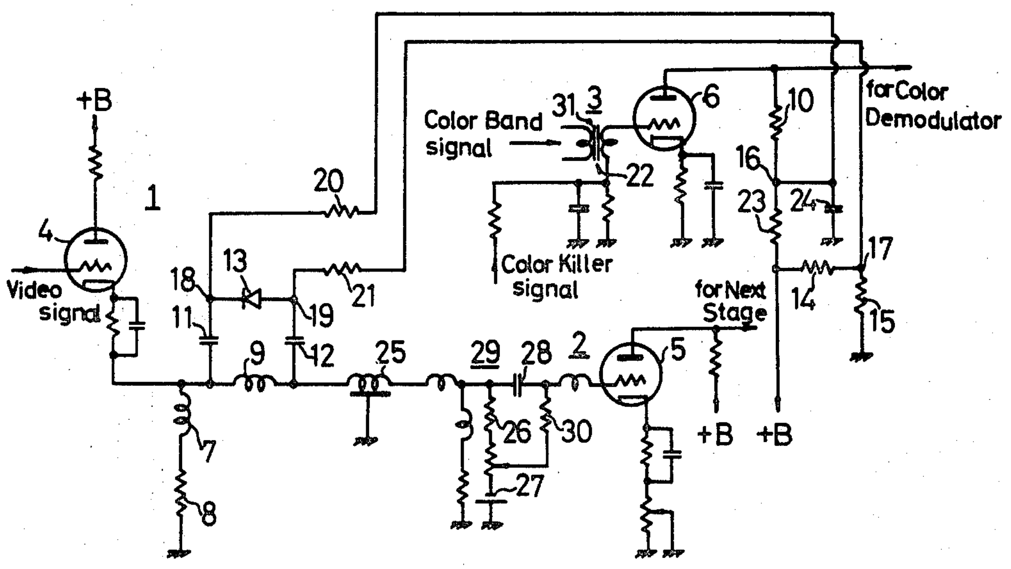
FIG. 1 is a circuit diagram showing the video amplifier circuit arrangement for a color television receiver according to an embodiment of the present invention.

Referring first to FIG. 1 of the drawings, the reference numeral 1 represents a first-stage video amplifier circuit, 2 a second-stage video amplifier circuit and 3 a second-stage color signal band amplifier circuit for example. The video amplifier circuits 1 and 2 and color signal band amplifier circuit 3 are commonly provided in the conventional television receivers, and therefore detailed description thereof will be omitted. The amplifier circuits 1, 2 and 3 include vacuum tubes 4, 5 and 6, respectively.

Wide band video signal is supplied to the grid of the vacuum tube 4 constituting the first-stage video amplifier circuit 1 as in the usual case. The cathode of the vacuum tube 4 is grounded through a series circuit constituted by a high-frequency compensating shunt-peaking coil 7 and a load resistor 8, so that video signal is available between the higher potential or "hot" side of the coil 7 and the ground. The video signal thus obtained between the "hot" side of the coil 7 and the ground is supplied to the grid of the vacuum tube 5 constituting the second-stage video amplifier circuit through a coupling circuit 29 including a high-frequency compensating series-peaking coil 9 which is inductively coupled or not coupled to the high-frequency compensating shunt-peaking coil 7, a delay line 25 and a coupling capacitor 28. A bias power source 27 with one terminal grounded has the other terminal connected with the delay line side terminal of the capacitor 28 of the coupling circuit 29 and the grid of the vacuum tube 5 through resistors 26 and 30 respectively, to impart a cathode bias to the vacuum tube 4 and a grid bias to the vacuum tube 5.

During reception of color television broadcast, color signal is supplied to the grid of the vacuum tube 6 constituting the color signal band amplifier circuit 3 through an input circuit 22 including a transformer 31 so as to be obtained across a resistor 10 connected with the plate of the vacuum tube, as is the usual case. The color signal thus obtained across the resistor 10 is supplied to a color demodulator circuit (not shown) through or not through the subsequent stage amplifier circuit. Color killer signal is supplied to the grid of the vacuum of the tube 6 during reception of black-and-white television broadcast as in the usual case, so that the vacuum tube 6 is thereby rendered nonconductive.

The foregoing arrangement is utilized in the conventional video amplifier circuits for color television receivers, and therefore further description thereof will be omitted. In accordance with an embodiment of the present invention a diode 13 is connected between the opposite terminals of the high-frequency compensating series-peaking coil 9 connected with the cathode of the vacuum tube 4 constituting the first-stage video amplifier circuit 1 through direct current blocking capacitors 11 and 12, respectively. Further, resistor 23 has one end thereof connected in series with the load resistor 10 of the color signal band amplifier circuit 3, and the other end is coupled to a +B power source with which are also connected voltage dividing resistors 14 and 15. The reference numeral 24 represents a bypass capacitor connected between the connection point between the resistors 10 and 25 and the ground.

The positive and negative electrode terminals 18 and 19 of the diode 13 are connected with the connection point 16 between the resistors 10 and 13 and the connection point 17 between the resistors 14 and 15 through resistors 20 and 20, respectively.

Figure 2:
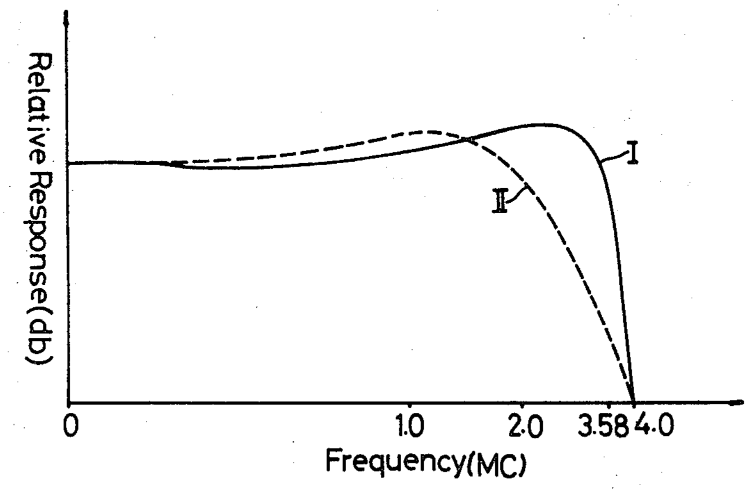
FIG. 2 is a view illustrating frequency response curves useful for explaining the circuit arrangement shown in FIG. 1.

With the foregoing arrangement, during reception of black-and-white television broadcast, color killer signal is supplied to the grid of the vacuum tube 6 constituting the color signal band amplifier circuit 3 so that the vacuum tube 6 is thereby maintained in the nonconducting state. Therefore, the potential at the connection point 16 is substantially equal to the voltage of the +B power source, and the potential at the connection point 17 is lower than the voltage of the +B power source so that the diode 13 is reversely biased so as to be rendered nonconductive. Thus, during reception of black-and-white television broadcast, the output of the first-stage video amplifier circuit 1 is subjected to high-frequency compensation by the high-frequency compensating series-peaking coil 9 and then supplied to the second-stage video amplifier circuit 2. Consequently, it is possible to achieve a high-frequency compensated frequency response characteristic with respect to the video signal as shown at I in FIG. 2, thus resulting in a picture with high resolution.

During reception of color television broadcast, color killer signal is not supplied to the color signal band amplifier circuit 3 so that the vacuum tube 6 is maintained in the conducting state to amplify the color signal. In this case, a plate current flows through the vacuum tube 6 to cause voltage drop across the resistors 23 and 10 so that the potential at the connection point 16 is decreased. Therefore, by previously choosing the values for the resistors 10, 23 and 14, 15 such that the potential at the connection point 16 becomes lower than that at the connection point 17, the diode 13 is biased in the forward direction so as to be substantially rendered conductive. Thus, the high-frequency compensating series-peaking coil 9 is short-circuited through the diode 13 and hence the high-frequency compensating function thereof is lost so that the video output of the first-stage amplifier circuit 1 is supplied to the second-stage video amplifier circuit 2 without being subjected to high-frequency compensation. By previously selecting the compensation range of the series-peaking coil 9 to be substantially equal to the color signal band, it is possible to achieve a narrow-band frequency response characteristic with respect to the video signal as shown at II in FIG. 2. In this way, the response in the color signal band can be sufficiently suppressed, so that a high-quality color picture can be produced which is free from dotted pattern stemming from the presence of the color subcarrier.

As described above, the present invention is characterized in that the desired purpose can effectively be achieved with the aid of the greatly simplified circuit.

In the foregoing, description has been made of the case where the peaking coil 9 is connected across the diode 13 through the direct current blocking capacitors 11 and 12. However, it is also possible that a resonance circuit adapted for resonating at the color subcarrier frequency (3.58 mc.) or a frequency in the vicinity thereof may be constituted by either or both of the capacitors 11 and 12 and the peaking coil 9. It will be appreciated that with such arrangement, the aforementioned effect can be further increased.

Although, in the foregoing, description has been made of the case where the diode 13 is connected in parallel with the series-peaking coil 9 of the first-stage video amplifier circuit 1, it is also possible that the diode may be connected with the shunt-peaking coil 7. Alternatively, the diode may be connected with a high-frequency peaking coil provided at a position after the second-stage video amplifier circuit. Furthermore, it will be readily apparent that the present invention is applicable not only to the cases where the video amplifier circuits are constituted by vacuum tubes but also to the cases where use is made of transistors.

In the foregoing, the bias voltage to render the diode conductive or nonconductive was obtained with the aid of the color signal band amplifier circuit. However, it is also possible to obtain such bias voltage by means of other vacuum tube or transistor circuit responsive to the presence or absence of color killer signal or by specially providing such circuit. Other various modifications will become possible.

Figure 3:
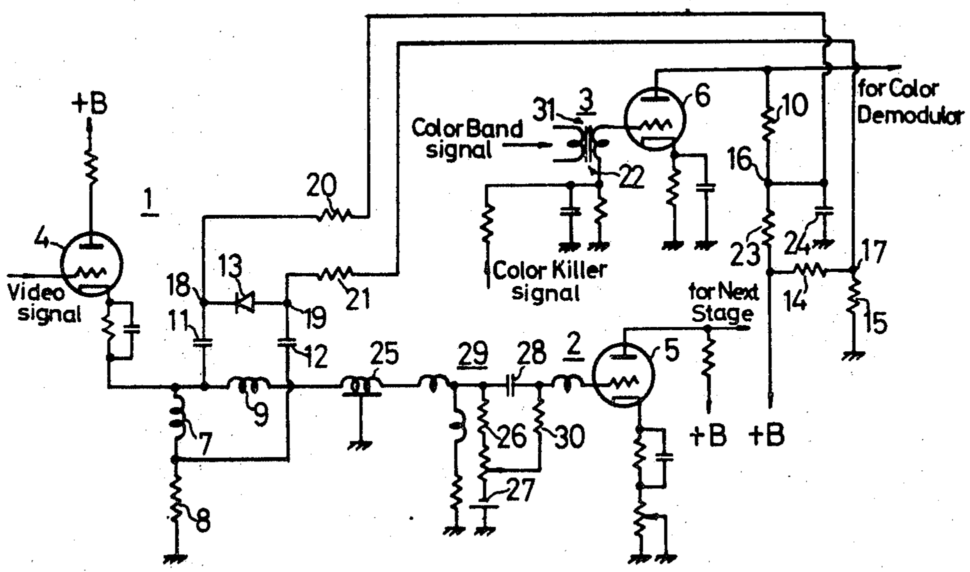
FIG. 3 is a circuit diagram showing a second embodiment of the present invention.

FIG. 3 shows a second embodiment of the present invention, which is similar to the embodiment described above in connection with FIG. 2, except that the capacitor 12 is not connected with the delay line 25 side terminal of the series-peaking coil 9 but with the resistor 8 side terminal of the shunt-peaking coil 7 so that the diode 13 is connected across the shunt-peaking coil 7 through capacitors 11 and 12. Therefore, parts of FIG. 3 corresponding to those of FIG. 1 are indicated by similar reference symbols, and detailed description thereof will be omitted. It will be readily apparent to those skilled in the art that similar operational effect to that described above in connection with FIG. 1 can be produced.

Figure 4:
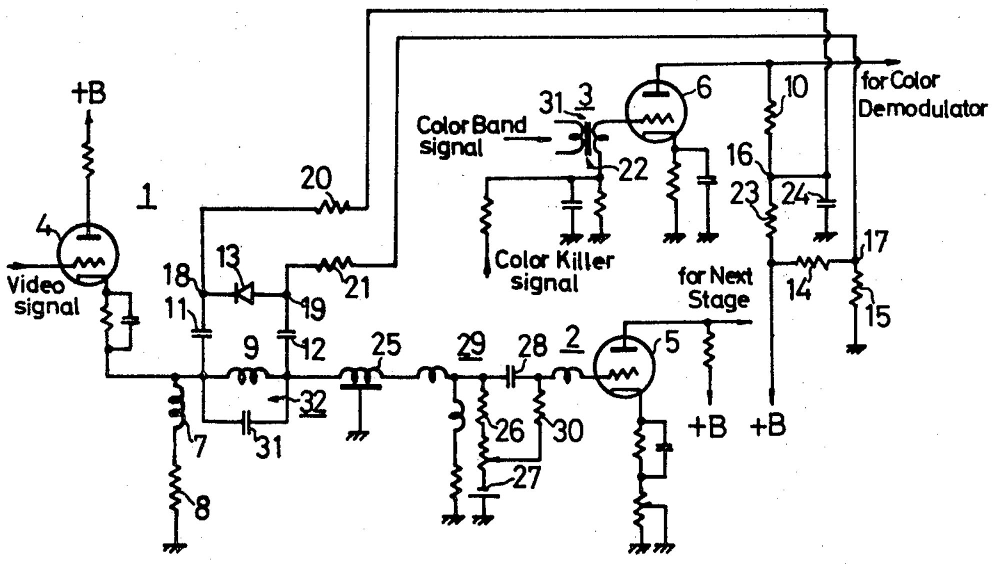
FIG. 4 is a circuit diagram showing the third embodiment of the present invention.

FIG. 4 shows a third embodiment of the present invention which is similar to the FIG. 1 embodiment, except that a capacitor 31 is connected in parallel with the series-peaking coil 9 to constitute a resonance circuit 32 adapted for resonating at the color subcarrier frequency (3.58 mc.) by the use of the capacitor 31 and coil 9 and which serves as trap circuit for the carrier wave in the color signal band within the video signal band. Therefore, parts of FIG. 4 corresponding to those of FIG. 1 are indicated by similar reference symbols, and detailed description thereof will be omitted. It will be readily appreciated that similar operational effect to that described above in connection with FIG. 1 can be produced.

Figure 5:
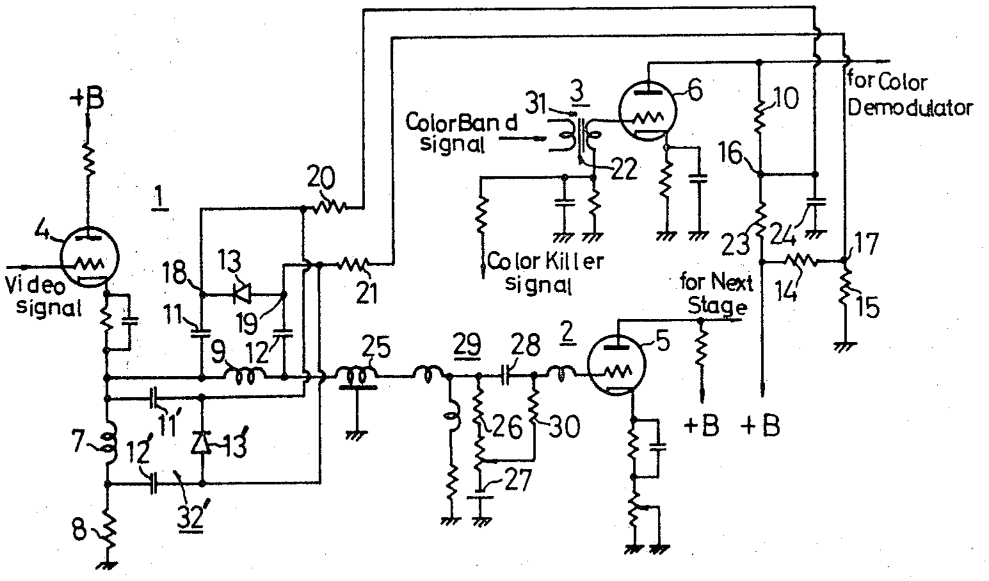
FIG. 5 is a circuit diagram showing the fourth embodiment of the present invention.

FIG. 5 shows a fourth embodiment which corresponds to a combination of the arrangements described above in connection with FIGS. 1 and 3, wherein a diode 13 is connected in parallel with series-peaking coil 9 through capacitors 11 and 12, and a diode 13′ is connected in parallel with shunt-peaking coil 7 through capacitors 11′ and 12′, the diodes 13 and 13′ being connected with the connection points 16 and 17, respectively. Parts of FIG. 5 corresponding to those of FIGS. 1 and 3 are indicated by similar reference numerals, and detailed description thereof will be omitted.

It will be readily apparent to those skilled in the art that operational effect similar to that described in connection with FIG. 1 can be produced.

Figure 6:
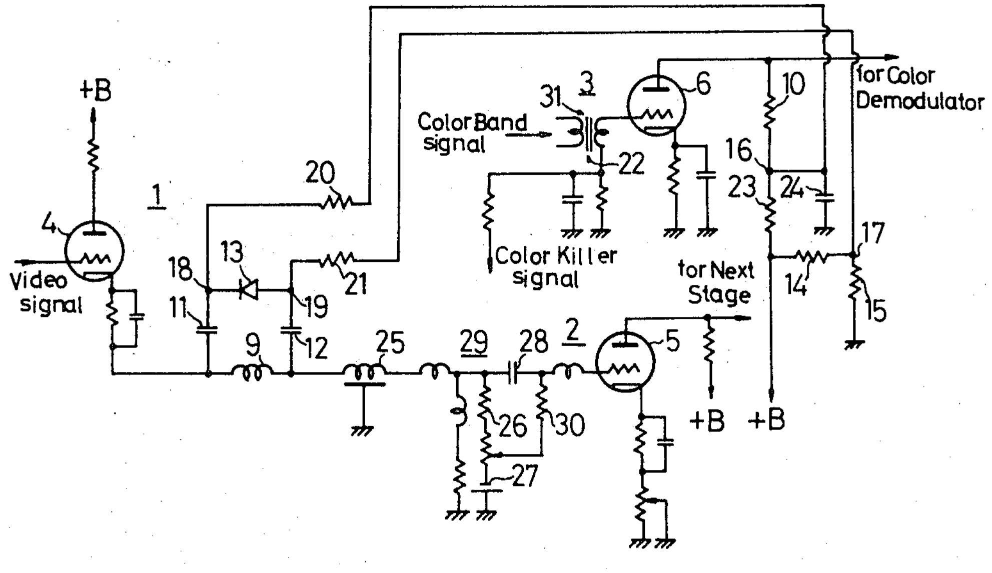
FIG. 6 is a circuit diagram showing the fifth embodiment of the present invention.

FIG. 6 shows a fifth embodiment of the present invention, which is similar to that shown in FIG. 1 except that the shunt-peaking coil 7 is omitted.

Figure 7:
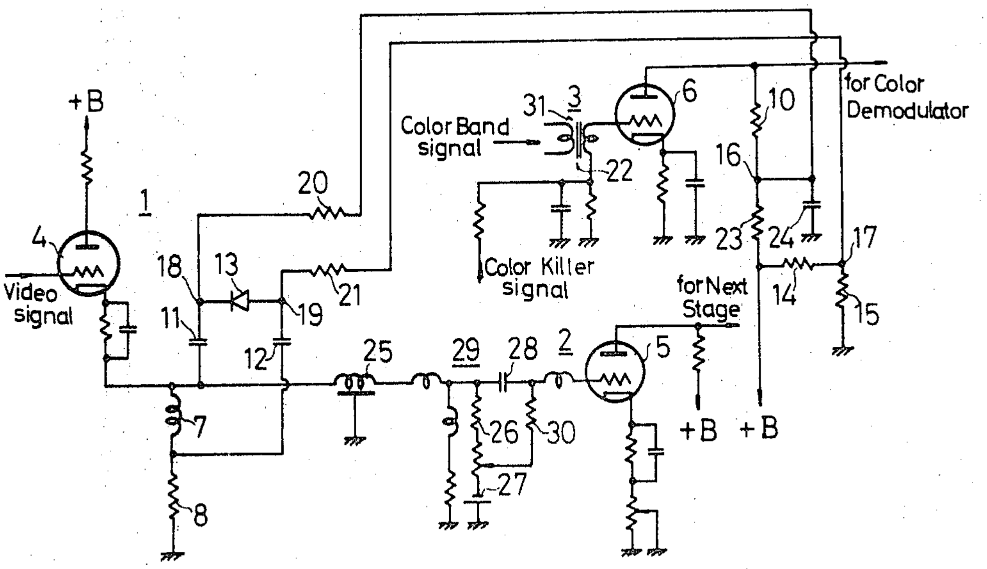
FIG. 7 is a circuit diagram showing the sixth embodiment of the present invention.

FIG. 7 shows a sixth embodiment of the present invention, which is similar to that shown in FIG. 3 except that the series-peaking coil 9 is omitted.

Therefore, parts of FIGS. 6 and 7 corresponding to those of FIGS. 1 and 3 are indicated by similar reference numerals, and it will be readily apparent to those skilled in the art that with the arrangements of FIGS. 6 and 7, similar effects to those described above in connection with FIGS. 1 and 3 can be produced.

Figure 8:
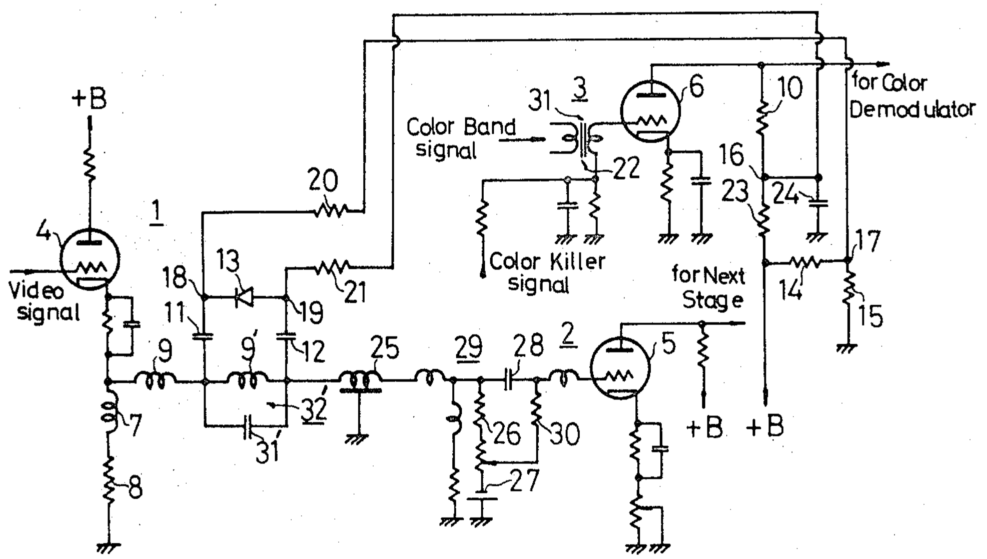
FIG. 8 is a circuit diagram showing the seventh embodiment of the present invention.

FIG. 8 shows a seventh embodiment of the present invention, which is similar to FIG. 1 except that a parallel circuit 32′ of a coil 9′ and capacitor 32′ is connected in series with the series-peaking coil 9, the capacitors 11 and 12 being disconnected from the series-peaking coil 9 and coupled to the opposite ends of the coil 9′ respectively, those ends of the resistors 20 and 21 which are connected with the diode 13 being coupled to the anode and cathode of the diode 13 respectively. Parts of FIG. 8 corresponding to those of FIG. 1 are indicated by similar reference numerals, and a trap circuit for the carrier wave in the color signal band is constituted by the coil 9′ and capacitor 31′ as described above in connection with FIG. 4. With the arrangement of FIG. 8, the trap circuit constituted by the coil 9′ and capacitor 31′ is short-circuited by the diode during reception of black-and-white television broadcast while such short circuit is not caused during reception of color television broadcast. Thus, it is possible to produce operational effect similar to that described above in connection with FIG. 4.

Figure 9:
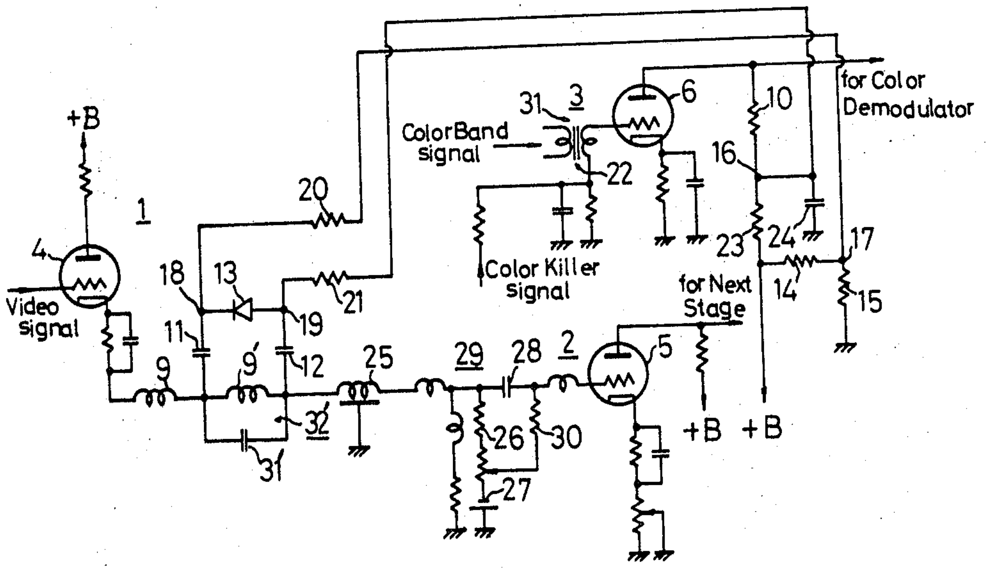
FIG. 9 is a circuit diagram showing the eighth embodiment of the present invention.

FIG. 9 shows an eighth embodiment of the present invention, which is similar to FIG. 8 except that the shunt-peaking coil 7 is omitted as in the case of FIG. 6.

Figure 10:
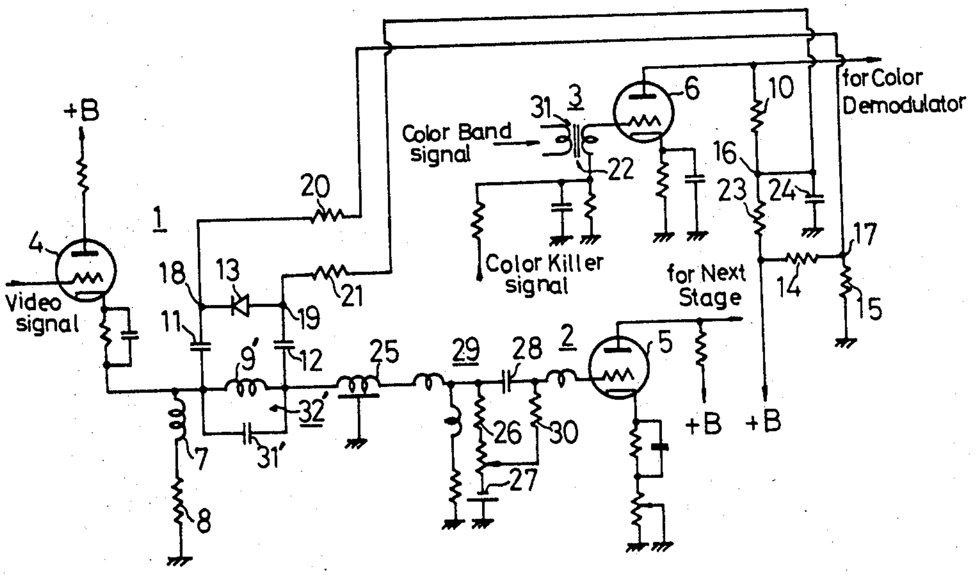
FIG. 10 is a circuit diagram showing the ninth embodiment of the present invention.

FIG. 10 shows a ninth embodiment of the present invention, which is similar to FIG. 8 except that the series-peaking coil 9 is omitted as in the case of FIG. 7.

Therefore, parts of FIGS. 9 and 10 corresponding to those of FIG. 8 are indicated by similar reference numerals, and it will be readily apparent to those skilled in the art that with the arrangements of FIGS. 9 and 10, it is also possible to produce operational effect similar to that described above.

It will be understood that modifications and variations may be effected without departing from the spirit and scope of the novel concepts of the present invention.

I claim:

1. A video amplifier circuit arrangement for a color television receiver, comprising a video amplifier circuit including a high-frequency compensating peaking coil, a diode connected in parallel with said peaking coil, means connected to a DC power supply circuit of a color band signal amplifier controlled by a color killer signal for providing a first DC bias voltage during reception of black-and-white television broadcast and a second DC bias voltage different from the first bias voltage during reception of color television broadcast, and electrical conductor means supplying said first and second bias voltages to said diode, wherein said diode is rendered nonconductive by said first bias voltage during reception of black-and-white television broadcast while during reception of color television broadcast diode is rendered conductive by said second bias voltage so that said peaking coil is short-circuited therethrough.

2. A video amplifier circuit arrangement for a color television receiver, comprising a video amplifier circuit including a trap circuit constituted by a coil and a capacitor, a diode connected in parallel with said trap circuit, means connected to a DC power supply circuit of a color band signal amplifier controlled by a color killer signal for providing a first DC bias voltage during reception of black-and-white television broadcast and electrical conductor means supplying said first and second voltages to said diode, wherein said diode is rendered conductive by said first bias voltage during reception of black-and-white television broadcast so that said trap circuit is short-circuited therethrough, while during reception of color television broadcast said diode is rendered nonconductive by said second bias voltage.

3. A video amplifier circuit arrangement according to claim 1 wherein said peaking coil is a series-peaking coil.

4. A video amplifier circuit arrangement according to claim 1 wherein said peaking coil is a shunt-peaking coil.

5. A video amplifier circuit arrangement for a color television receiver, comprising a video amplifier circuit including a high-frequency compensating series-peaking coil, a high-frequency compensating shunt-peaking coil coupled or not coupled to said series-peaking coil, a pair of diodes respectively connected in parallel with said series-peaking coil and shunt-peaking coil respectively, means connected to a DC power supply circuit of a color band signal amplifier controlled by a color killer signal for providing a first DC bias voltage during reception of black-and-white television broadcast and a second DC bias voltage during reception of color television broadcast, and electrical conductor means connecting said first and second bias voltages to said diodes, wherein said diodes are rendered nonconductive by said first bias voltage during reception of black-and-white television broadcast while during reception of color television broadcast said diodes are rendered conductive by said second bias voltage so that said series-peaking coil and shunt-peaking coil are short-circuited therethrough respectively.

6. A video amplifier circuit arrangement according to claim 1 wherein a capacitor is connected in parallel with said peaking coil to constitute a trap circuit with the coil.

7. A video amplifier circuit arrangement according to claim 2 wherein a series-peaking coil is connected to said trap circuit in series relationship thereto.

8. A video amplifier circuit arrangement according to claim 2 wherein a shunt-peaking coil is connected to said trap circuit in parallel relationship thereto.

9. A video amplifier circuit arrangement according to claim 2 wherein a series-peaking coil and a shunt-peaking coil are connected to said trap circuit in series and parallel relationship thereto respectively.

10. A video amplifier circuit arrangement according to claim 1 comprising a color signal band amplifier which is operative and inoperative during reception of color television broadcast and black-and-white television broadcast respectively, and including a resistor across which said first and second DC bias voltages are obtained during reception of black-and-white television broadcast and color television broadcast respectively.

11. A video amplifier circuit arrangement according to claim 1 including a pair of capacitors which connect said diode across the peaking coil so that a trap circuit is established by the peaking coil and the capacitors when said diode is rendered conductive.